(12) United States Patent
Yan et al.

(10) Patent No.: US 10,699,817 B2
(45) Date of Patent: Jun. 30, 2020

(54) ROTARY DEVICE FOR NUCLEAR POWER FACILITY

(71) Applicant: IHI CORPORATION, Tokyo (JP)

(72) Inventors: Xinglong Yan, Naka (JP); Akihito Otani, Tokyo (JP); Satoshi Takahashi, Tokyo (JP); Yoshiyuki Imai, Naka (JP); Hiroyuki Sato, Naka (JP)

(73) Assignee: IHI CORPORATION, Tokyo (JP)

( * ) Notice: Subject to any disclaimer, the term of this patent is extended or adjusted under 35 U.S.C. 154(b) by 740 days.

(21) Appl. No.: 15/354,445

(22) Filed: Nov. 17, 2016

(65) Prior Publication Data

US 2017/0148534 A1     May 25, 2017

Related U.S. Application Data

(63) Continuation of application No. PCT/JP2015/063554, filed on May 12, 2015.

(30) Foreign Application Priority Data

May 21, 2014    (JP) ................... 2014-105242

(51) Int. Cl.
*G21C 15/24*     (2006.01)
*G21C 15/247*    (2006.01)
(Continued)

(52) U.S. Cl.
CPC ............ *G21C 15/247* (2013.01); *C22C 19/03* (2013.01); *F04D 7/08* (2013.01); *F04D 29/026* (2013.01);
(Continued)

(58) Field of Classification Search
None
See application file for complete search history.

(56) References Cited

U.S. PATENT DOCUMENTS

2005/0031893 A1    2/2005  Narita et al.
2009/0274928 A1   11/2009  Harada et al.
(Continued)

FOREIGN PATENT DOCUMENTS

CN    1988357 A  *  6/2007
GB    2234521 A     2/1991
(Continued)

OTHER PUBLICATIONS

Machine Translation of JP 2012177372 A retrieved Dec. 10, 2019 (Year: 2019).*

(Continued)

*Primary Examiner* — Michael Lebentritt
(74) *Attorney, Agent, or Firm* — Volpe and Koenig, P.C.

(57) ABSTRACT

A rotary device for a nuclear power facility, the rotary device being placed in a circuit for coolant containing radioactive nuclides in the nuclear power facility. The rotary device includes: a casing; and a rotary mechanism provided with, in the casing, a rotor and a rotor shaft that come into contact with the coolant containing the radioactive nuclides passing through the casing. Regarding the casing and the rotary mechanism, at least the rotor and the rotor shaft of the rotary mechanism comprise a low-effective diffusion coefficient alloy having a lower effective diffusion coefficient than a polycrystalline alloy.

2 Claims, 5 Drawing Sheets

(51) Int. Cl.

| | | |
|---|---|---|
| G21C 21/00 | (2006.01) | |
| G21C 17/022 | (2006.01) | |
| G21D 1/02 | (2006.01) | |
| F04D 7/08 | (2006.01) | |
| F04D 29/02 | (2006.01) | |
| C22C 19/03 | (2006.01) | |

(52) U.S. Cl.
CPC ......... *G21C 15/24* (2013.01); *G21C 17/0225* (2013.01); *G21C 21/00* (2013.01); *G21D 1/02* (2013.01); *C21D 2201/00* (2013.01); *F05D 2300/17* (2013.01); *F05D 2300/176* (2013.01); *Y02E 30/40* (2013.01)

(56) References Cited

U.S. PATENT DOCUMENTS

| | | |
|---|---|---|
| 2012/0000577 A1 | 1/2012 | Nazmy et al. |
| 2014/0044986 A1 | 2/2014 | Pillhoefer et al. |
| 2014/0053560 A1 | 2/2014 | Simpkin |
| 2016/0232993 A1* | 8/2016 | Kurina ................... G21C 3/58 |

FOREIGN PATENT DOCUMENTS

| | | | |
|---|---|---|---|
| JP | 01-124796 A | | 5/1989 |
| JP | 05-059473 A | | 3/1993 |
| JP | 05-059482 A | | 3/1993 |
| JP | 06-026495 A | | 2/1994 |
| JP | 10-319169 A | | 12/1998 |
| JP | 11-080905 A | | 3/1999 |
| JP | 2001-032045 A | | 2/2001 |
| JP | 2003-301792 A | | 10/2003 |
| JP | 2004-353057 A | | 12/2004 |
| JP | 2005-283411 A | | 10/2005 |
| JP | 2006-250828 A | | 9/2006 |
| JP | 2009-249658 A | | 10/2009 |
| JP | 2012177372 A | * | 9/2012 |
| WO | 2008/091377 A2 | | 7/2008 |
| WO | 2014/035514 A1 | | 3/2014 |

OTHER PUBLICATIONS

Chinese Office Action with English Translation, Chinese Patent Application No. 201580023931.6, dated Aug. 9, 2017, 11 pgs.

Qizhen, Y., China Electrical Engineering Canon, Jul. 31, 2009, 3 pgs. [http://www.400gb.com/shared/Folder_4997646_aee9f5ef/].

Extended European Search Report, European Patent Application No. 15796101.2, dated Nov. 27, 2017, 7 pgs.

Japanese Office Action dated Feb. 6, 2019 for the Japanese Patent Application No. 2014-105242 (partial English translation provided).

Kunitomi, "A high-temperature gas cooled reactor," An autumn convention of Atomic Energy Society of Japan 2013 synthesis lecture: Report 5 "A problem of a high-temperature gas cooled reactor, and solution (Safety, Economical efficiency, Sustainability)", Japan, Japan Atomic Energy Agency, (Sep. 4, 2013 ) (with English concise explanation of the relevance provided by Japanese Office Action dated Feb. 6, 2019 for the Japanese Patent Application No. 2014-105242 (partial English translation of Japanese Office Action provided)).

Yoshinari, "Manufacturing of Ni-base Superalloy Single Crystal Buckets for Industrial Gas Turbine by Using Unidirectional Solidification," Casting Engineering, Japan, 1996—68th volume, No. 12, p. 1141 to 1147 (1996) (with English concise explanation of the relevance provided by Japanese Office Action dated Feb. 6, 2019 for the Japanese Patent Application No. 2014-105242 (partial English translation of Japanese Office Action provided)).

Guiraldenq, "Engineers Guide to Diffusion—Section 6.2.2: Diffusion of Interstitial Impurity Atoms," (1984) (partial English translation provided).

* cited by examiner

ROTARY DEVICE FOR NUCLEAR POWER FACILITY

TECHNICAL FIELD

Embodiments described herein relates to a rotary device for a nuclear power facility, the rotary device being placed in a circuit of coolant containing radioactive nuclides in the nuclear power facility.

BACKGROUND ART

A conventional nuclear power plant such as the nuclear power facility described above is disclosed in, for example, Japanese Patent Laid-Open No. 10-319169.

The nuclear power plant includes a primary cooling circuit that circulates primary cooling helium, which acts as coolant containing radioactive nuclides, between a high-temperature reactor and a heat exchanger, and a secondary cooling circuit that circulates secondary cooling helium, which acts as a power generating fluid, between the heat exchanger and a power generation facility.

In this nuclear power plant, heat generated in the high-temperature reactor is transmitted to the heat exchanger by the primary cooling helium that circulates through the primary cooling circuit. In the heat exchanger, the heat of the primary cooling helium is transferred to the secondary cooling helium that circulates through the secondary cooling circuit, and the heat transferred to the secondary cooling helium is transmitted to the power generation facility to generate power.

In such a nuclear power plant, a circulator (rotary device) is typically disposed in the primary cooling circuit so as to circulate the primary cooling helium with higher speeds.

SUMMARY

In the circulator of the nuclear power plant described above, a polycrystalline alloy (normally-grained crystalline material) is used for a rotor or a rotor shaft in contact with the primary cooling helium containing radioactive nuclides. Thus, during operations repeated to circulate the primary cooling helium between the high-temperature reactor and the heat exchanger, the radioactive nuclides contained in the primary cooling helium, for example, silver may deeply diffuse into the polycrystalline alloy constituting the rotor or the rotor shaft.

Specifically, in the circulator of the conventional nuclear power plant, in order to prevent an operator from being exposed to, for example, gamma rays from silver having deeply diffused into the polycrystalline alloy, it is necessary to limit an operating time or use a remote device during maintenance. This may disadvantageously cause high maintenance cost, which has been a conventional problem to be solved.

The present disclosure has been made in consideration of the conventional problem. An object of the present disclosure is to provide a rotary device for a nuclear power facility that can prevent radioactive nuclides from deeply diffusing into a material constituting a rotor or a rotor shaft in contact with coolant containing the radioactive nuclides, thereby reducing the cost of maintenance.

As shown in FIG. 5, the diffusion of the radioactive nuclides into a material is a phenomenon in which the atoms of a material are replaced with the atoms of the radioactive nuclides, for example, the atoms of silver (Ag) by heat. It is known that the speed of diffusion from a surface S of the material to a grain boundary Ca, which is a border of a crystal grain C, is higher than that at the center of the crystal grain C.

In view of this phenomenon, the inventors found that the number of crystal grains (grain boundaries) in a unit volume can be reduced by increasing the grain diameters of crystal grains or single crystallization, that is, an Ag content increased by diffusion per unit volume can be reduced by narrowing the areas of grain boundaries having high diffusion speeds.

Moreover, the inventors have also focused on a lattice diffusion coefficient and found that the amount of diffusion can be also reduced by adding (doping) a large amount of an element having a smaller lattice diffusion coefficient than that of Ni to an ordinary Ni-base alloy so as to reduce the lattice diffusion coefficient (change an alloy composition). Thus, the present disclosure is achieved.

In this case, diffusion coefficients including both of a grain boundary diffusion coefficient and a lattice diffusion coefficient are denoted as "effective diffusion coefficient."

Thus, the present disclosure provides a rotary device for a nuclear power facility, the rotary device being placed in a circuit for coolant containing radioactive nuclides in the nuclear power facility, the rotary device including: a casing; and a rotary mechanism provided with, in the casing, a rotor and a rotor shaft that come into contact with the coolant containing the radioactive nuclides passing through the casing, wherein regarding the casing and the rotary mechanism, at least the rotor and the rotor shaft of the rotary mechanism comprise a low-effective diffusion coefficient alloy having a lower effective diffusion coefficient than a polycrystalline alloy.

In the rotary device for the nuclear power facility according to the present disclosure, for example, the radioactive nuclides of a fission product generated in a nuclear reactor and a radioactive corrosion product generated by corrosion of a core internal-structure material may be contained in the coolant and may be introduced into the casing so as to be deposited in contact with the rotor and the rotor shaft of the rotary mechanism. Even in this case, regarding the casing and the rotary mechanism, at least the rotor and the rotor shaft of the rotary mechanism comprise a low-effective diffusion coefficient alloy having a lower effective diffusion coefficient than a polycrystalline alloy (normally-grained crystalline material), which can suppress the diffusion of radioactive nuclides deeply into the rotor and the rotor shaft of the rotary mechanism.

Additionally, regarding the casing and the rotary mechanism, at least the rotor and the rotor shaft of the rotary mechanism are hardly contaminated by radioactive nuclides, thereby reducing the amount of radioactive waste during the dismantlement of the facility.

The present disclosure can achieve quite an excellent effect of preventing radioactive nuclides from deeply diffusing into a material constituting at least a rotor or a rotor shaft, thereby reducing the cost of maintenance.

DESCRIPTION OF EMBODIMENTS

The present disclosure will be described below with reference to the accompanying drawings.

Figure 1:
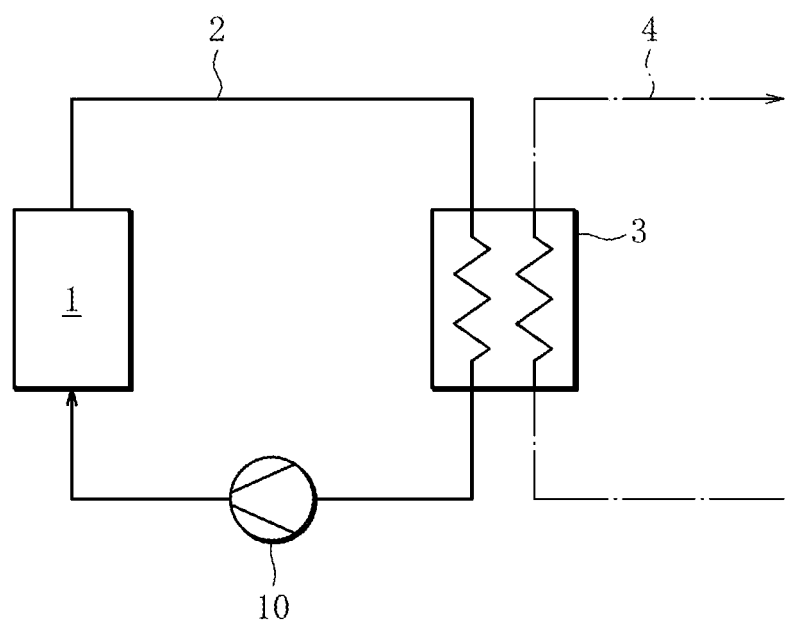
FIG. 1 is a schematic diagram showing a cooling circuit for a nuclear power plant including a rotary device for a nuclear power facility according to an embodiment of the present disclosure.
Figure 2:
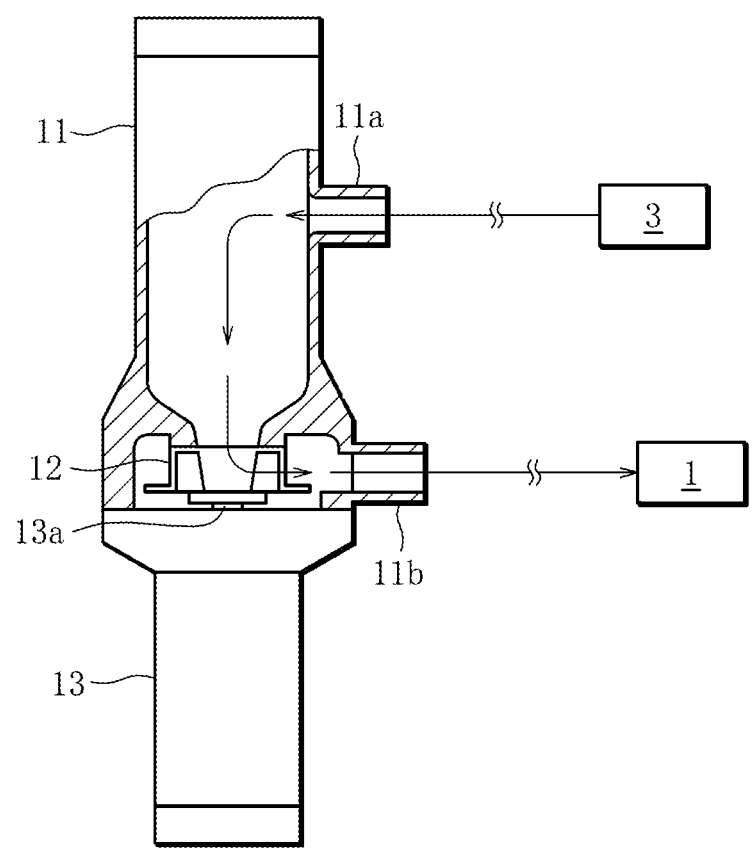
FIG. 2 is a side explanatory drawing showing a cross section of a rotary mechanism part of the rotary device shown in FIG. 1.

FIGS. 1 and 2 show an embodiment of a rotary device for a nuclear power facility according to the present disclosure. In this embodiment, the rotary device for the nuclear power facility according to the present disclosure is used as a circulator for a nuclear power plant for explanation as an example.

As shown in FIG. 1, the nuclear power plant includes a primary cooling circuit (circuit) 2 that circulates primary cooling helium, which acts as coolant containing radioactive nuclides, between a high-temperature reactor 1 and a heat exchanger 3, and a secondary cooling circuit 4 that circulates secondary cooling helium, which acts as a power generating fluid, between the heat exchanger 3 and a power generation facility (not shown).

In this nuclear power plant, the primary cooling helium circulating through the primary cooling circuit 2 transmits high-temperature heat (about 950° C.), which is generated by nuclear fission in nuclear fuel in the high-temperature reactor 1, to the heat exchanger 3. In the heat exchanger 3, the heat of the primary cooling helium is transferred to the secondary cooling helium circulating through the secondary cooling circuit 4, and the heat transferred to the secondary cooling helium is transmitted to the power generation facility to generate power.

A circulator (rotary device) 10 used in such a nuclear power plant accelerates the primary cooling helium in the primary cooling circuit 2 between the high-temperature reactor 1 and the heat exchanger 3 after heat is transferred to the secondary cooling helium, and then the circulator 10 returns the primary cooling helium to the high-temperature reactor 1. As shown in FIG. 2, the circulator 10 includes a casing 11 having an inlet 11a and an outlet 11b, an impeller (rotor) 12 accommodated in the casing 11, and a motor 13.

The impeller 12 is fixed to an output shaft 13a (rotor shaft) of the motor 13 and constitutes a rotary mechanism with the output shaft 13a. The impeller 12 rotates in response to the output of the motor 13, accelerates the primary cooling helium introduced into the casing 11 through the inlet 11a of the casing 11 from the heat exchanger 3, and discharges the helium to the high-temperature reactor 1 from the outlet 11b.

In this case, regarding the casing 11 and the rotary mechanism of the circulator 10, at least the impeller 12 and the output shaft 13a of the rotary mechanism comprise a low-effective diffusion coefficient alloy having a lower effective diffusion coefficient than a polycrystalline alloy (normally-grained crystalline material), that is, a coarsely-grained crystalline material with a larger grain size to have a lower effective diffusion coefficient prepared by reducing a cooling speed in solidification of molten metal or performing heat treatment.

In this case, regarding the casing 11 and the rotary mechanism of the circulator 10, at least the impeller 12 and the output shaft 13a of the rotary mechanism may be made of a monocrystalline material having a lower effective diffusion coefficient prepared by solidifying molten metal from its one end in one direction.

In the circulator 10 according to the present embodiment, the radioactive nuclides of a fission product generated in the high-temperature reactor 1 and a radioactive corrosion product generated by corrosion of a core internal-structure material may be contained in the primary cooling helium and may be introduced into the casing 11 so as to be deposited in contact with the impeller 12 and the output shaft 13a of the rotary mechanism. Even in this case, the impeller 12 and the output shaft 13a of the rotary mechanism are made of a coarsely-grained crystalline material or a monocrystalline material having a lower effective diffusion coefficient than a polycrystalline alloy (normally-grained crystalline material), which can suppress deep diffusion of radioactive nuclides into the impeller 12 and the output shaft 13a of the rotary mechanism.

This can reduce the cost of maintenance. Additionally, the impeller 12 and the output shaft 13a of the rotary mechanism are hardly contaminated by radioactive nuclides, thereby reducing the amount of radioactive waste during the dismantlement of the facility.

Figure 3:
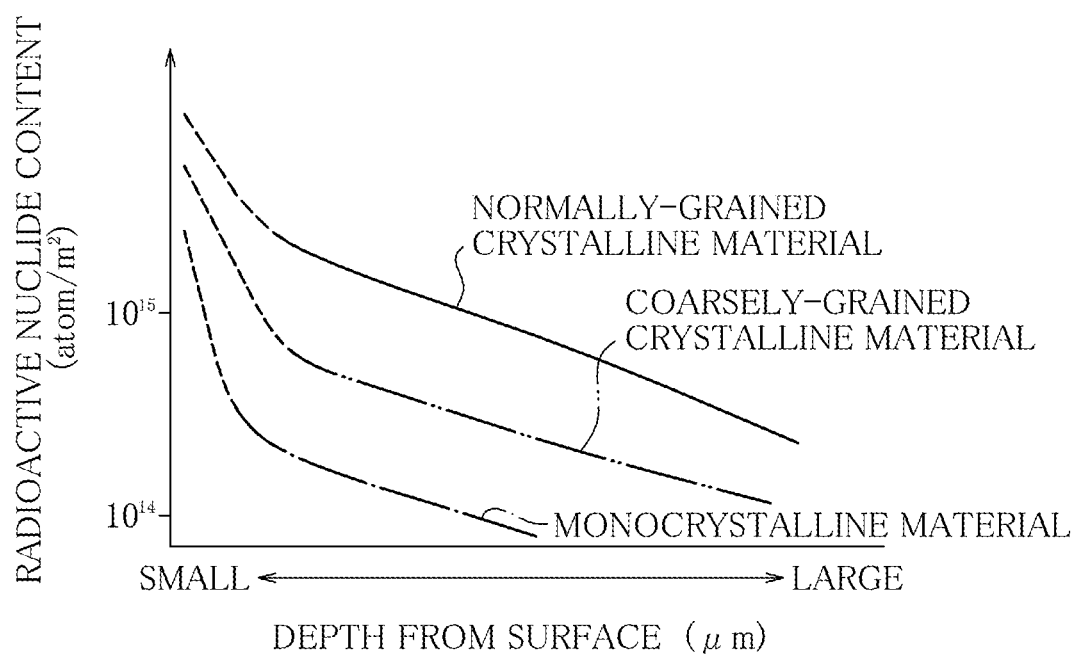
FIG. 3 is a graph showing the effect of the rotary device for the nuclear power facility according to the embodiment.

The content of radioactive nuclides in the use of a polycrystalline alloy (normally-grained crystalline material) for the impeller 12 and the output shaft 13a of the rotary mechanism of the circulator 10 was compared with the content of radioactive nuclides in the use of the coarsely-grained crystalline material described above. As shown in the graph of FIG. 3, in the case of using a polycrystalline alloy (normally-grained crystalline material), radioactive nuclides are deeply diffused from the surface of the impeller 12 or the output shaft 13a, whereas in the case of using a coarsely-grained crystalline material, radioactive nuclides are not deeply diffused.

In the case of using a monocrystalline material with an effective diffusion coefficient reduced to one hundredth of that of a polycrystalline alloy (normally-grained crystalline material), in particular, it is found that the content of radioactive nuclides in a deep portion is reduced to one tenth.

This proved that the circulator 10 according to this embodiment can prevent radioactive nuclides from deeply diffusing into the impeller 12 and the output shaft 13a of the rotary mechanism.

In the embodiment described above, the impeller 12 and the output shaft 13a of the rotary mechanism are made of a coarsely-grained crystalline material or a monocrystalline material having a lower effective diffusion coefficient than that of a polycrystalline alloy (normally-grained crystalline material). According to another embodiment, the impeller 12 and the output shaft 13a of the rotary mechanism may be made of a lattice diffusion coefficient reducing material prepared by doping Ni with an element having a lower lattice diffusion coefficient than Ni. According to still another embodiment, a coarsely-grained crystalline material containing a monocrystalline material having a lower effective diffusion coefficient may be combined with a lattice diffusion coefficient reducing material prepared by doping Ni with an element having a lower lattice diffusion coefficient than Ni.

Figure 4:
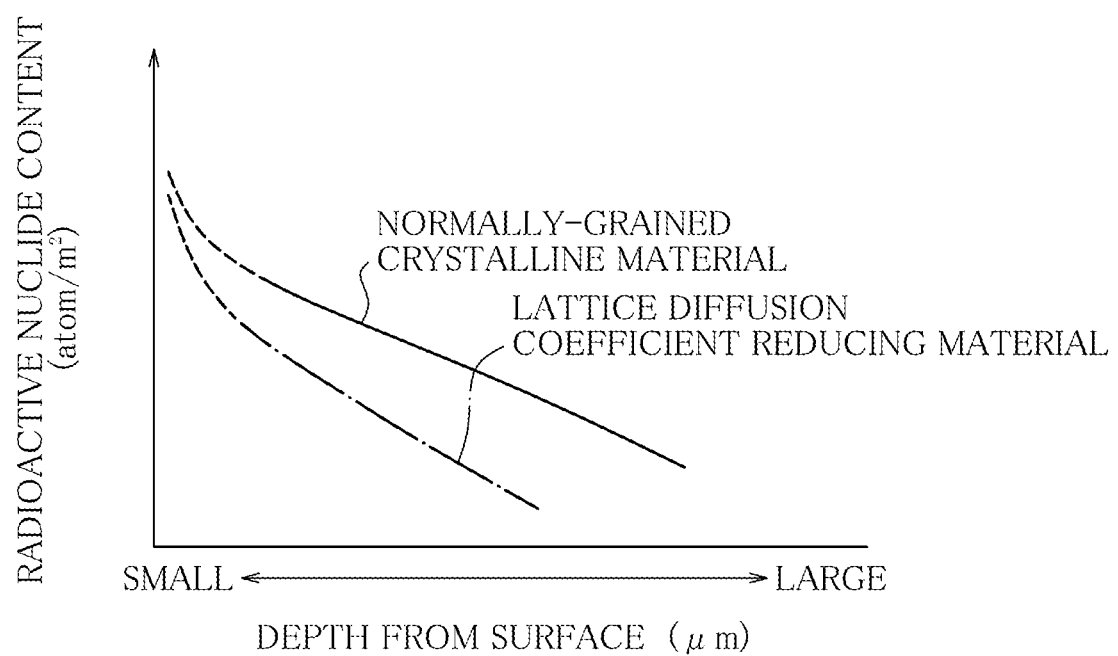
FIG. 4 is a graph showing the effect of a rotary device for a nuclear power facility according to another embodiment.
Figure 5:
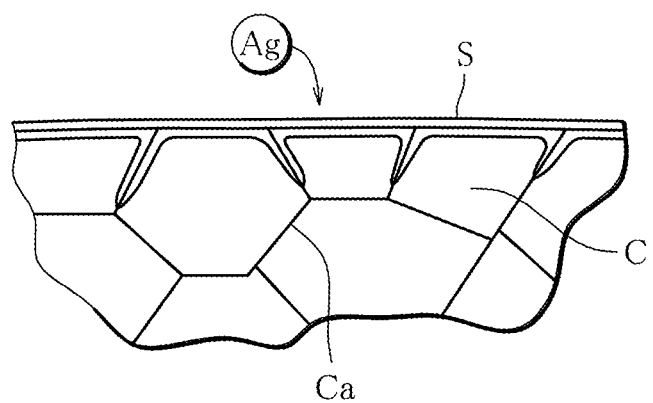
FIG. 5 is a schematic diagram showing crystal grains and crystal boundaries near the surface of a polycrystalline alloy.

The content of radioactive nuclides in the use of a polycrystalline alloy (normally-grained crystalline material) for the impeller 12 and the output shaft 13a of the rotary mechanism of the circulator 10 was compared with the content of radioactive nuclides in the use of the reduced lattice diffusion coefficient material according to the another embodiment. As shown in the graph of FIG. 4, in the case of using a polycrystalline alloy (normally-grained crystalline material), radioactive nuclides are deeply diffused from the surface of the impeller 12 or the output shaft 13a, whereas in the case of using a lattice diffusion coefficient reducing material, radioactive nuclides are not deeply diffused.

This proved that the circulator 10 according to this embodiment can prevent radioactive nuclides from deeply diffusing into the impeller 12 and the output shaft 13a of the rotary mechanism.

In the embodiment described above, the rotary device for the nuclear power facility according to the present disclosure is used as a circulator for a nuclear plant for explanation as an example. The present disclosure is not limited to this configuration and is also applicable to a centrifugal circulator (pump), an axial-flow circulator (pump), a steam turbine, a gas turbine, or a gas compressor in a nuclear fuel reprocessing facility or a nuclear fuel fabrication facility.

In the embodiment described above, a low-effective diffusion coefficient alloy having a lower effective diffusion coefficient than that of a polycrystalline alloy is used only for the impeller 12 and the output shaft 13a of the rotary mechanism. The present disclosure is not limited to this configuration. In another configuration, a low-effective diffusion coefficient alloy having a lower effective diffusion coefficient than that of a polycrystalline alloy is also applicable to the casing 11.

The configuration of the rotary device for the nuclear power facility according to the present disclosure is not limited to the configuration of the embodiment described above. For example, the rotor of the rotary mechanism may be a blade or the rotary mechanism may include a turbine disc, a bearing, or a sealing member.

A first aspect of the present disclosure is a rotary device for a nuclear power facility, the rotary device being placed in a circuit for coolant containing radioactive nuclides in the nuclear power facility, the rotary device including a casing and a rotary mechanism provided with, in the casing, a rotor and a rotor shaft that come into contact with the coolant containing the radioactive nuclides passing through the casing. Regarding the casing and the rotary mechanism, at least the rotor and the rotor shaft of the rotary mechanism comprise a low-effective diffusion coefficient alloy having a lower effective diffusion coefficient than a polycrystalline alloy (normally-grained crystalline material).

According to a second aspect of the present disclosure, the low-effective diffusion coefficient alloy is a coarsely-grained crystalline material containing a monocrystalline material with a larger grain size to have a lower effective diffusion coefficient than the polycrystalline alloy.

According to a third aspect of the present disclosure, the low-effective diffusion coefficient alloy is a lattice diffusion coefficient reducing material prepared by doping Ni with an element having a lower lattice diffusion coefficient than Ni.

According to a fourth embodiment of the present disclosure, the low-effective diffusion coefficient alloy is a combination of a coarsely-grained crystalline material containing a monocrystalline material with a larger grain size to have a lower effective diffusion coefficient than the polycrystalline alloy and a lattice diffusion coefficient reducing material prepared by doping Ni with an element having a lower lattice diffusion coefficient than Ni.

In the rotary device for the nuclear power facility according to the present disclosure, the nuclear power facility includes a nuclear power plant having a nuclear reactor, a nuclear fuel reprocessing facility, and a fuel fabrication facility.

In the rotary device for the nuclear power facility according to the present disclosure, the rotary device includes a centrifugal circulator (pump), an axial-flow circulator (pump), a steam turbine, a gas turbine, and a gas compressor.

In the rotary device for the nuclear power facility according to the present disclosure, the coolant containing radioactive nuclides may be helium, water, or sodium.

In the rotary device for the nuclear power facility according to the present disclosure, the radioactive nuclides of a fission product generated in the nuclear reactor and a radioactive corrosion product generated by corrosion of a core internal-structure material may be contained in the cooling fluid and may be introduced into the casing so as to be deposited in contact with the impeller and the rotor shaft of the rotary mechanism. Even in this case, regarding the casing and the rotary mechanism, at least the rotor and the rotor shaft of the rotary mechanism are made of a low-effective diffusion coefficient alloy having a lower effective diffusion coefficient than a polycrystalline alloy (normally-grained crystalline material), which can suppress the deep diffusion of radioactive nuclides into the rotor and the rotor shaft of the rotary mechanism.

Additionally, regarding the casing and the rotary mechanism, at least the rotor and the rotor shaft of the rotary mechanism are hardly contaminated by radioactive nuclides, thereby reducing the amount of radioactive waste during the dismantlement of the facility.

The invention claimed is:

1. A rotary device for a nuclear power facility, the rotary device being placed in a circuit for primary cooling helium containing radioactive nuclides in the nuclear power facility, the rotary device comprising:
   a casing; and
   a rotary mechanism provided with, in the casing, a rotor and a rotor shaft that come into contact with the primary cooling helium containing the radioactive nuclides passing through the casing,
   wherein regarding the casing and the rotary mechanism, at least the rotor and the rotor shaft of the rotary mechanism are made of a monocrystalline material which suppresses deep diffusion of the radioactive nuclides into the rotor and the rotor shaft of the rotary mechanism.

2. A rotary device for a nuclear power facility, the rotary device being placed in a circuit for coolant containing radioactive nuclides in the nuclear power facility, the rotary device comprising:
   a casing; and
   a rotary mechanism provided with, in the casing, a rotor and a rotor shaft that come into contact with the coolant containing the radioactive nuclides passing through the casing,
   wherein regarding the casing and the rotary mechanism, at least the rotor and the rotor shaft of the rotary mechanism are composed of an Ni-base alloy doped with an element having a lower lattice diffusion coefficient than Ni to reduce the lattice diffusion coefficient of the Ni-base alloy.

* * * * *